US006262164B1

(12) United States Patent
Church et al.

(10) Patent No.: US 6,262,164 B1
(45) Date of Patent: *Jul. 17, 2001

(54) METHOD OF INSTALLING INSULATION WITH DRY ADHESIVE AND/OR COLOR DYE, AND REDUCED AMOUNT OF ANTI-STATIC MATERIAL

(75) Inventors: Joseph T. Church, Memphis, TN (US); Charles Chenoweth, Coldwater, MI (US); Gary E. Romes, Cincinnati, OH (US); Mark H. Vegedes, Warrenville, IL (US)

(73) Assignee: Guardian Fiberglass, Inc., Albion, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/391,420

(22) Filed: Sep. 8, 1999

Related U.S. Application Data

(60) Division of application No. 08/904,270, filed on Jul. 31, 1997, now Pat. No. 6,012,263, and a continuation-in-part of application No. 08/589,620, filed on Jan. 22, 1996, now Pat. No. 5,666,780, which is a continuation-in-part of application No. 08/572,626, filed on Dec. 14, 1995, now Pat. No. 5,641,368, which is a continuation-in-part of application No. 08/856,121, filed on May 14, 1997, now Pat. No. 5,921,055.

(51) Int. Cl.[7] .............................. C08K 3/40; C04B 14/42

(52) U.S. Cl. .......................... 524/494; 524/493; 524/557; 106/711

(58) Field of Search ..................................... 524/494, 493; 106/711

(56) References Cited

U.S. PATENT DOCUMENTS

| | | |
|---|---|---|
| 1,888,841 | 11/1932 | Wenzel et al. . |
| 2,989,790 | 6/1961 | Brown . |
| 3,619,437 | 11/1971 | McDonald, Jr. . |
| 4,134,242 | 1/1979 | Musz et al. . |
| 4,177,618 | 12/1979 | Felter . |
| 4,272,935 | 6/1981 | Lukas et al. . |
| 4,310,996 | 1/1982 | Mulvey et al. . |
| 4,468,336 | 8/1984 | Smith . |
| 4,487,365 | 12/1984 | Sperber . |
| 4,648,920 | 3/1987 | Sperber . |
| 4,673,594 | 6/1987 | Smith . |
| 4,699,834 | 10/1987 | Schiffer . |
| 4,708,978 | 11/1987 | Rodgers . |
| 4,710,309 | 12/1987 | Miller . |
| 4,712,347 | 12/1987 | Sperber . |
| 4,741,777 | 5/1988 | Williams et al. . |
| 4,768,710 | 9/1988 | Sperber . |
| 4,773,960 | 9/1988 | Vincelli et al. . |
| 4,804,695 | 2/1989 | Horton . |
| 4,822,679 | 4/1989 | Cerdan-Diaz et al. . |
| 4,842,650 | 6/1989 | Blounts . |
| 5,085,897 | 2/1992 | Luckanuck . |
| 5,118,751 | 6/1992 | Shulze et al. . |
| 5,131,590 | 7/1992 | Sperber . |
| 5,155,964 | 10/1992 | Fortin et al. . |
| 5,171,802 | 12/1992 | Salazar . |
| 5,287,674 | 2/1994 | Sperber . |
| 5,342,897 | 8/1994 | Franzman et al. . |
| 5,389,167 | 2/1995 | Sperber . |
| 5,393,794 | 2/1995 | Sperber . |
| 5,421,922 | 6/1995 | Sperber . |
| 5,426,163 | 6/1995 | Buehler et al. . |
| 5,536,784 | 7/1996 | Mao et al. . |
| 5,608,011 | 3/1997 | Eck et al. . |
| 5,655,350 | 8/1997 | Patton . |
| 5,666,780 | 9/1997 | Romes et al. . |
| 5,683,810 | 11/1997 | Babbit et al. . |
| 5,703,156 | 12/1997 | Sauer . |
| 5,786,082 | 7/1998 | Evans et al. . |
| 5,819,496 | 10/1998 | Sperber . |
| 5,952,418 | 9/1999 | Romes et al. . |

FOREIGN PATENT DOCUMENTS

| | | |
|---|---|---|
| 2538829 | 7/1984 | (FR) . |
| 5338525 | 10/1978 | (JP) . |

OTHER PUBLICATIONS

CertaSpray Fiberglass Spray Insulation Manual/Brochure, 1982 Including Job Report and pp. 1–39.

Certa Spray Fiberglass Spray Insulation specification Sheet, 1982.

ASFI American Sprayed Fibers, Inc., Fireproofing and Acoustical Products.

Cafco Sound–Shield Application and Installation Manual.

Cafco Blaze–Shield and Blaze Shield II Application and Installation Manual.

Sun–System and Sun Guard II Sprayed Insulation by Sun-Coast Insulation Mfg., Co.

Perfect Fit Fiberglass Insulation.

(List continued on next page.)

*Primary Examiner*—Tae H. Yoon
(74) *Attorney, Agent, or Firm*—Hall, Priddy, Myers & Vande Sande

(57) ABSTRACT

A loose-fill insulation product is provided which includes a dry mixture of loose-fill fiberglass and an inorganic (being composed of matter other than plant or animal) adhesive in the form of a redispersible powder. During application, the dry loose-fill mixture is coated with a liquid (e.g. water) so as to activate the adhesive. Thereafter, the loose-fill mixture with activated adhesive is blown or sprayed into a cavity (open or closed) so as to insulate same. According to certain embodiments, this mixture may be blown into open attic areas so as to insulate same and reduce the movement of loose-fill insulation. It has been found that the redispersible powder (RP) dry adhesive mixes more uniformly within the dry mixture and clings better to the glass fibers when the mixture is substantially free of anti-static material. In certain embodiments, a color dye is provided in the mixture, and is activated upon installation.

4 Claims, 3 Drawing Sheets

OTHER PUBLICATIONS

The New Generation of Wall Insulation R–Pro Plus Wall System.

Sun Coast Insulation, S.A.B. Light Density.

CAFCO 400 Sprayed Fire Protection.

Spray–On Energy Seal, Energy Wise/Energy Seal, 1990.

METHOD OF INSTALLING INSULATION WITH DRY ADHESIVE AND/OR COLOR DYE, AND REDUCED AMOUNT OF ANTI-STATIC MATERIAL

This application is a division of application Ser. No. 08/904,270 filed Jul. 31, 1997 and now U.S. Pat. No. 6,012,263, which is a continuation-in-part (CIP) of Ser. No. 08/589,620, filed Jan. 22, 1996 (now U.S. Pat. No. 5,666, 780), which is a CIP of Ser. No. 08/572,626 filed Dec. 14, 1995 (now U.S. Pat. No. 5,641,368), and this application is also a CIP of Ser. No. 08/856,121, filed May 14, 1997 (now U.S. Pat. No. 5,921,055), the disclosures of which are all hereby incorporated herein by reference.

This invention relates to a loose-fill fiberglass/dry adhesive mixture and a method of applying same with a reduced amount of anti-static material. More particularly, this invention relates to a loose-fill/redispersible powder adhesive mixture and a method of applying same together with a liquid (e.g. water) for activating the adhesive in order to create a uniform insulating product. In certain embodiments, a powder form unactivated color dye may be provided in the mixture, with the dye being activated by the liquid upon installation.

BACKGROUND OF THE INVENTION

Fiberglass batt installation typically requires the time consuming cutting up or shaping of batts when the need arises to fill abnormally shaped open cavities between studs, or insulate around electric boxes, wires, and the like. Furthermore, structures insulated with batts often suffer from less than desirable thermal and sound insulation due to the void areas sometimes found around the edges of the batts adjacent studs or other supporting structure.

In recent years, a number of loose-fill insulation systems have been developed in an attempt to overcome these disadvantages inherent in residential fiberglass batt usage. In order to get low density loose-fill fiberglass insulation into enclosed vertically extending residential wall (stud bounded) cavities in a practical manner and at a commercially acceptable cost, it has heretofore been known to resort to the BIBS (Blown-In-Blanket™) system disclosed, for example, in U.S. Pat. Nos. 4,712,347 and 5,287,674 to Sperber. Many residential contractors and the like currently use BIBS instead of fiberglass batts for the purpose of improving insulative qualities (both thermal and sound) and application efficiency.

In accordance with BIBS, a supporting structure such as flexible netting (e.g. nylon) or the like is affixed across a plurality of wall studs in order to enclose vertically extending wall stud defined cavities. Thereafter, hole(s) are formed in the netting and a blowing hose is inserted into the hole(s) for the purpose of filling the enclosed wall cavities with blown loose-fill siliconized fiberglass insulation. An exemplary insulation which may be used in conjunction with BIBS is InsulSafe III™ available from CertainTeed Corp., Valley Forge, Pa. This loose-fill fiberglass is said to be able to achieve an R-15 at a density of 2.5 lbs./ft$^3$ when 3.5 inches thick.

In commercial BIBS applications, the loose-fill siliconized fiberglass may be blown using a commercially available Ark-Seal machine which coats the loose-fill with a liquid adhesive as the insulation is blown behind the netting or other (e.g. rigid) retaining structure. One of the instant inventors has heard through the grapevine that this has also been used in attic applications. Unfortunately, the use of this liquid adhesive results in a number of problems, including: (i) the liquid adhesive often gums up the adhesive jet and/or hose thereby causing application and clean-up inefficiencies and hardships; (ii) storage and transport of the liquid adhesive to job sites are burdensome, costly, and render the liquid adhesive susceptible to freezing—the adhesive may be damaged if frozen; (iii) user clean-up of the liquid adhesive equipment (i.e. hose, pump, nozzle, and environment) is time-consuming and cuts into potential production time; (iv) getting the proper adhesive/fiberglass mixture or ratio in the field (i.e. on site) is not as easy as it would seem—users are forced to manually mix the adhesive on site prior to use, this often leading to an improper (too much or too little) LOI (indicative of adhesive quantity) in the final blown insulation product which in turn creates a non-uniform application; and finally (v) users at the job site often may not make use of the required adhesive and simply spray water with the fiberglass in an attempt to save both time and money—this leading to a potentially inferior insulation product prone to settling after installation is complete. Still further, some users may simply blow loose-fill, without water, into attics.

U.S. Pat. Nos. 4,710,309 and 4,804,695 also disclose insulation blowing systems where the loose-fill is coated with a liquid adhesive prior to application and during the blowing process. Again, such systems suffer from the problems listed above which are inherent with the use of liquid adhesive.

It will be apparent from the above that there exists a need in the art for eliminating the need for the use of liquid adhesive.

As will be appreciated, insulation products are properly divided into two distinct categories: organic vs. inorganic. Fiberglass, an inorganic insulation product, has long been the insulation of choice among architects, builders, and contractors because it is non-moisture-absorbing, fire retardant, and provides consistently uniform R-values. In recent years, however, cellulose, an organic insulation product, has come into favor with many builders, particularly because of its cost and its use of natural products such as newspaper, cardboard, etc. (i.e. recyclability). Unfortunately, cellulose and its organic nature are generally viewed by many as undesirable in BIBS and other spray/blow applications for the following reasons: (i) its organic nature renders it attractive to mold, mildew, fungus, rodents, vermin, etc.; (ii) cellulose is penetrated by moisture (moisture does not simply coat the product as with fiberglass) rendering it susceptible to rot, decay, and requiring undesirably long cure times when exposed to liquid spray additives (especially in humid environments); (iii) cellulose often settles to a greater degree in cavities than, for example, fiberglass, thereby decreasing R-values within a filled cavity as time passes; (iv) cellulose is less aesthetically appealing to many users than fiberglass; and (v) cellulose is non-fire-resistant because of its organic nature and therefore requires an added chemical load for flame retardance purposes—this, of course, increasing cost and sometimes creating an unfriendly odor.

For example, U.S. Pat. No. 4,773,960 discloses a cellulose loose-fill insulation system (see also Suncoast's S.A.B.™ System). Dry organic adhesive and cellulose-based insulation are sprayed or blown together with water which activates the adhesive during blowing. As set forth in the '960 patent, "insulation of the cellulose fiber type can be pre-treated with an adhesive which, when moistened, becomes activated and improves the setting properties of the insulation." Unfortunately, such cellulose pre-treated products are organic in nature and suffer from the inherent problems outlined above. Furthermore, the dry adhesive used to "pre-treat" the cellulose in the '960 patent as well as other cellulose systems is starch-based (i.e. organic). An actual adhesive disclosed in the '960 patent is wheat starch (organic). Again, the organic nature of such pre-treating agents renders them susceptible to mold, mildew, fungus, rodents, vermin, etc., especially when in storage along with the cellulose prior to use.

It is also to be pointed out that many prior art fiberglass and cellulose products have high LOI values which leads to increased cost of product. It would satisfy a need in the art if a fiberglass system/product with a low LOI could be provided so as to improve yields while still resulting in uniform applications.

It will be apparent to those of skill in the art that a need exists in the art for a mixture including an inorganic insulation (e.g. fiberglass) and a dry inorganic adhesive for use in fiberglass spray systems which avoids the problems inherent in the pre-treated organic cellulose products discussed above thereby resulting in uniform and efficient product applications.

It will also be apparent to those of skill in the art that a need exists in the art for a dry mixture including inorganic insulation (e.g. fiberglass or plastic fiber) and a dry adhesive which can be blown into attic areas easier and cheaper than in the past.

There also exists a need in the art for a method and corresponding insulation mixture, having a dry-adhesive mixed therein wherein the dry-adhesive has improved retention characteristics within the mixture. There also exists a need in the art for a product and method for determining whether operators have properly installed the insulation product (e.g. did they actually use the water or adhesive-activating liquid during installation?).

The term "LOI" (loss-on-ignition) as used herein is defined by ASTM C764-91, incorporated herein by reference. LOT refers to the known method for measuring the binder content of loose-fill mineral fiber insulation.

SUMMARY OF THE INVENTION

Generally speaking, this invention fulfills the above-described needs in the art by providing a dry loose-fill fiberglass insulation mixture adapted to be blown together with an activating liquid into a cavity, the mixture comprising:

loose-fill fiberglass;

a dry powder adhesive mixed with the loose-fill fiberglass so that when the mixture is coated with the liquid and blown into a cavity, the adhesive is activated; and wherein the insulation mixture of fiberglass and dry powder adhesive is substantially free of anti-static material (defined as less than about 0.05% by weight of the mixture).

According to certain preferred embodiments of this invention, the dry adhesive includes vinyl ester of versatic acid terpolymer in the form of a redispersible powder (RP). Other redispersible powders may be used instead, or in addition.

In certain embodiments, the RP is based on copolymers of vinyl acetate and a type of ethylene.

This invention further fulfills the above-described needs in the art by providing a system for blowing a fiberglass/dry adhesive mixture into a cavity for purposes of insulation, the system comprising:

a blower for blowing a dry mixture of loose-fill fiberglass and inorganic powder adhesive;

a pump for pumping an activating liquid so that the blown dry fiberglass/adhesive mixture substantially free of anti-static material is coated with the liquid, the liquid activating the inorganic adhesive; and means for blowing the coated mixture of loose-fill fiberglass and activated adhesive into a cavity so as to insulate the cavity.

According to certain preferred embodiments of this invention, the means for blowing results in the installed mixture in the cavity having a density of less than or equal to about 2.5 lb.\ft$^3$ and an R-value of at least about 3.15 per inch thickness.

This invention still further fulfills the above-described needs in the art by providing a method of spraying or blowing loose-fill fiberglass insulation into a cavity, the method comprising the steps of:

providing loose-fill fiberglass;

mixing the loose-fill fiberglass together with a dry inorganic adhesive powder to make up a loose-fill mixture substantially free of anti-static material;

applying a liquid to the loose-fill mixture in order to activate the adhesive; and spraying or blowing the loose-fill mixture with activated adhesive into the cavity so as to insulate the cavity.

This invention further fulfills the above-described needs in the art by providing a method of insulating an attic by spraying or blowing loose-fill fiberglass insulation into an attic area to be insulated, the method comprising the steps of:

providing an attic area to be insulated;

providing loose-fill fiberglass;

mixing the loose-fill fiberglass together with a dry polymeric based redispersible powder adhesive in order to make up a loose-fill insulation mixture substantially free of anti-static material, the mixture being from about 0.25 to 5.0% (preferably from about 0.75 to 2.5%) by weight redispersible powder; and spraying or blowing the loose-fill insulation mixture together with an adhesive activating liquid into the attic area to be insulated so that the loose-fill mixture is retained in the attic area in order to insulate same with fiberglass insulation, the resulting mixture in the attic having an applied LOI percentage no greater than about 3.0%, a density of less than about 1.5 lbs./ft$^3$, and an R-value of at least about 2.7 per inch thickness of insulation.

In certain attic embodiments, the redispersible powder that is mixed with the loose-fill fiberglass is based on copolymers of vinyl acetate and ethylene, and includes a protective colloid.

In certain embodiments, the loose-fill fiberglass may be blown together with the RP and a dry water-activatable color dye so that the dye is activated upon installation when hit with the RP activating liquid (e.g. water) thereby being an indicator that the insulation was installed with the liquid. The dye becomes much more colorful and viewable to the naked eye when activated.

This invention will now be described with respect to certain embodiments thereof, accompanied by certain illustrations wherein:

DETAILED DESCRIPTION OF CERTAIN EMBODIMENTS OF THIS INVENTION

Figure 1:
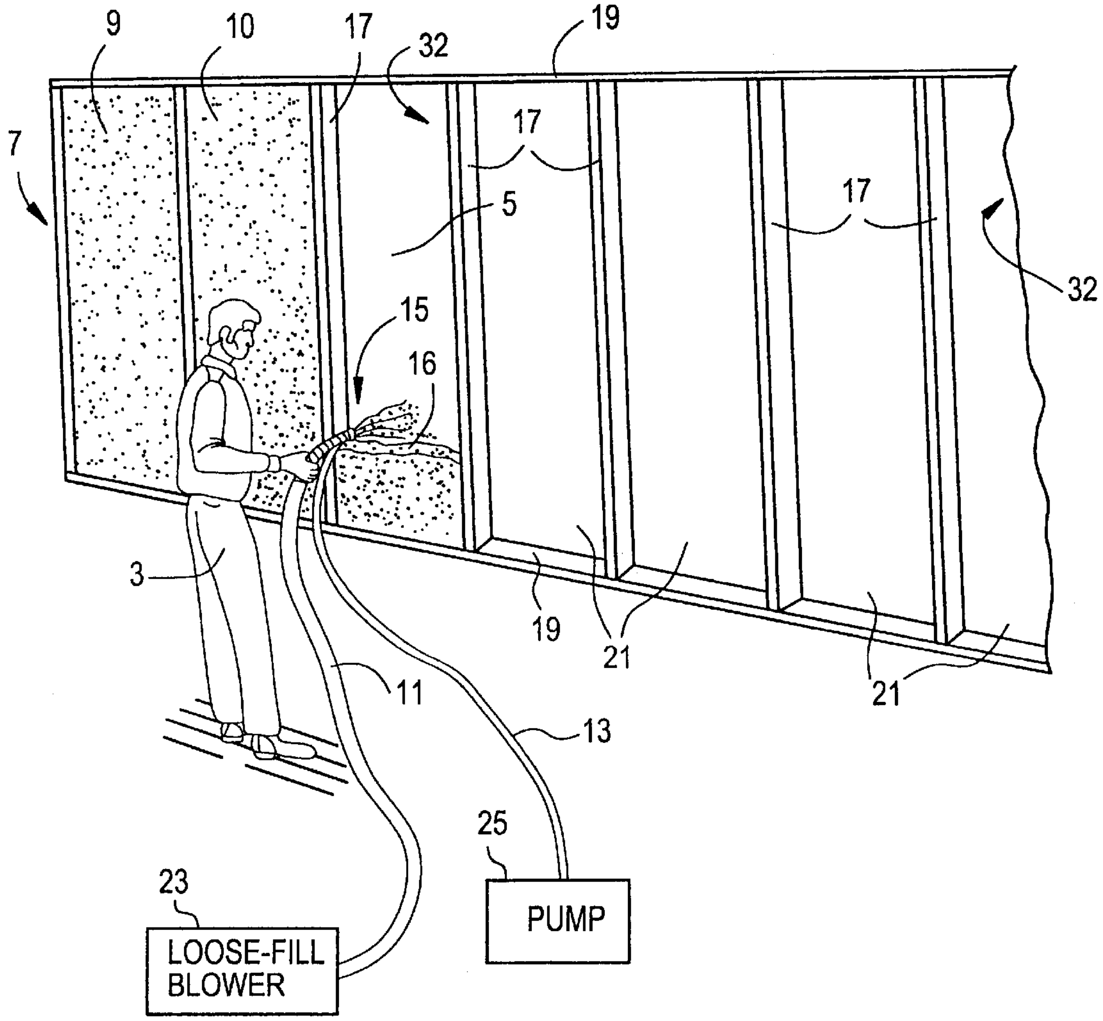
FIG. 1 is a perspective view of a user blowing/spraying a loose-fill fiberglass/dry adhesive mixture coated with an activating liquid such as water into a vertically extending open wall cavity according to an embodiment of this invention.

Referring now more particularly to the accompanying drawings in which like reference numerals indicate like parts throughout the several views.

In accordance with this invention, a loose-fill mixture of (i) fiberglass and (ii) an inorganic dry adhesive in the form of a redispersible powder (RP), is blown or sprayed together with an activating liquid (e.g. water) into a cavity (open or closed) to be insulated. According to alternative embodiments, the loose-fill mixture is blown/sprayed into attic areas, such as onto floors or slanted (inclined) surfaces, to be insulated.

It has been found that, surprisingly, by reducing the amount of anti-static or anti-stat material in the dry mixture of RP and fiberglass, the RP is more uniformly distributed throughout the mixture and clings better to the glass fibers, presumably due to the increase in static electricity. In certain embodiments, the dry mixture will therefore include less than 0.10% by weight of anti-static material, and most preferably is substantially free of anti-static material. Exemplary anti-static materials known in the trade include CS-II quaternary ammonium salts from Sunshine Chemical Specialties, Inc.

The liquid applied to the mixture during blowing/spraying activates the dry adhesive (and optionally the color dye discussed below) so that when the insulating mixture reaches the cavity it is retained, or sticks, therein as will be described below. In such a manner, it is ensured that the proper adhesive amount is present in the product. Thus, the user needs only to add an activating liquid such as water to the mixture at the job site in order to achieve a premium residential insulation product which yields high R-values and cost-effective densities together with uniform and consistent applications. Additionally, productivity is increased due to the elimination of the need for mixing and clean-up.

Firstly, a dry mixture of loose-fill fiberglass and dry adhesive in the form of a redispersible powder (RP) is provided. An exemplary white loose-fill fiberglass which may be used is Perfect Fit™, commercially available from Guardian Fiberglass, Albion, Mich. Perfect Fit™ has a standard cube size and is coated with silicone (or other water-resistant hydrophobic agent) as known in the trade.

The dry latex adhesive which is mixed with the loose-fill fiberglass may be, according to certain embodiments, a vinyl ester copolymer based resin. Such a dry adhesive is available from Air Products, Lehigh Valley, Pa., as AIRFLEX™ RP-238. In a typical formulation, RP-238 is a redispersible powder which shows excellent adhesion, water resistance, and workability. Its solid content is 99±1%, and it utilizes a protective colloid of polyvinyl alcohol. Other redispersible powders having similar properties may also be used.

Other inorganic redispersible powders (RPs) from Air Products which may be utilized in any and all embodiments herein include (a) Airflex® RP-140 which is a vinyl acetate/ethylene copolymer resin type RP with a polyvinyl alcohol (PA) protective colloid [99±1% solids content] [RP-140 has a white powder appearance, includes an anti-blocking agent content of 10±2%, has a glass transition temperature of 2° C./36° F., and is semi-transparent, tough-elastic]; (b) Airflex® RP-224 that is a vinyl acetate-ethylene (VAE) copolymer resin type RP having a particle size of max 5% over 60 mesh, and a polyvinyl alcohol protective colloid [typical properties of dispersion made from this RP include about a 1–5 microns predominant particle size, a glass transition temperature of +16° C., and a minimum film-forming temperature of +4°]; (c) Airflex® RP-225 that has a vinyl acetate-ethylene (VAE) copolymer resin type and a PA colloid; (d) Airflex® RP-226 that has a VAE copolymer resin type and PA protective colloid; (e) Airflex® RP-230 that has a VAE copolymer resin type and PA protective colloid; (f) Airflex® RP-244 [VAE copolymer and PA protective colloid]; (g) Airflex® RP-245 [VAE copolymer resin and PA protective colloid]; (h) Airflex® RP-2010 [VAE copolymer resin type and PA protective colloid]; (i) Airflex® RP-2020 [VAE copolymer resin type, PA colloid, max 5% particle size over 60 mesh particle size]; (j) Airbond® SP-102 [acrylic copolymer resin type, glass transition temperature of 5° C./41° F., white powder appearance, and protective colloid]; and (k) Airbond® SP-490 RP that has a vinyl ester copolymer resin type, PA colloid, and min. film forming temperature of 0° C. These Airflex® and Airbond® RPs are available from Air Products.

The non-activated dry adhesive powder (e.g. RP-238) is mixed with the loose-fill fiberglass, preferably at the manufacturing plant, so that the resulting mixture is from about 0.1 to 2.0% by weight dry adhesive, the remaining weight being substantially represented by the fiberglass (and possibly de-dusting and/or small amounts of anti-static agents). As discussed above, it has been found that the lesser the amount of anti-static material in the mixture, the better the RP sticks to the glass or plastic fibers and the more uniformly it is distributed. According to certain preferred embodiments, the dry mixture is from about 0.50 to 0.75% by weight RP adhesive. Thus, the mixture is from about 98 to 99.9%, preferably from about 99.0 to 99.50% by weight loose-fill fiberglass. As will be discussed below, in attic embodiments the RP% may be from about 0.75–2.5% by weight of the mixture.

Figure 2:
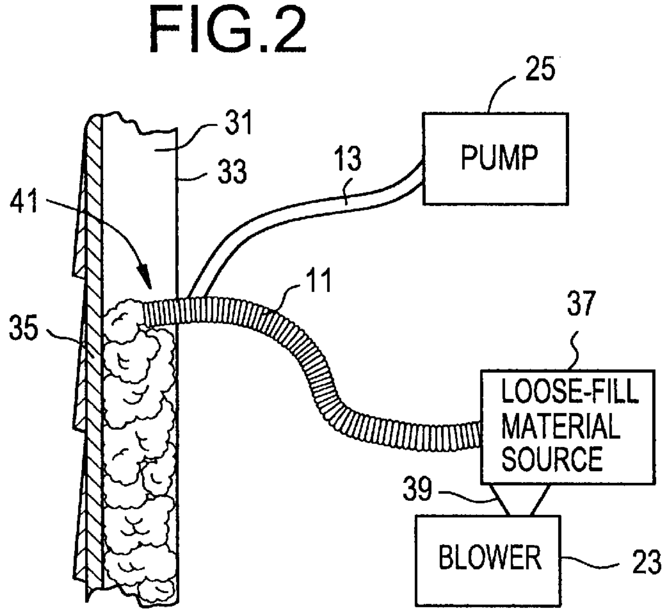
FIG. 2 is a perspective view of a user blowing/spraying a loose-fill fiberglass/dry adhesive mixture coated with activating liquid into a vertically extending cavity closed with a supporting structure according to another embodiment of this invention.

The fiberglass loose-fill/dry adhesive mixture may be sprayed or blown into both enclosed and open cavities according to different embodiments of this invention following activation of the adhesive. FIG. 1 is a perspective view of the mixture being wetted with an activating liquid (e.g. water) and thereafter blown into a vertically extending open cavity, while FIG. 2 is a perspective view of the mixture being wetted and thereafter blown into an enclosed cavity (e.g. in accordance with systems where a rigid structure encloses the cavity so as to retain the insulation therein).

As shown in FIG. 1, user 3 is provided with dry mixture blow hose 11 and activating liquid supply hose 13. At nozzle area 15, the loose-fill/dry adhesive mixture blown from hose 11 is coated or wetted with the activating liquid (e.g. water) from hose 13 and thereafter sprayed/blown into open cavity 5. Alternatively, hoses 11 and 13 may be combined at an earlier stage so that user 3 is provided with only one hose nozzle to grip. In either case, the dry adhesive in the mixture supplied through hose 11 is activated when wetted with the liquid from hose 13. After activation of the adhesive, the wet mixture is blown into the cavity. The nozzle is held from about 18"–24" from the cavity to be insulated in certain embodiments.

As shown in FIG. 1, the sprayed insulation mixture with activated adhesive adheres to or sticks to wall 32 which may be made of plywood, Celotex™, or any other known residential exterior insulating sheeting. No netting or other supporting structure is needed to retain the sprayed on mixture in open cavity 5 as shown in FIG. 1.

Each cavity is bounded on either side by vertical studs 17 and on the top and bottom by horizontal studs 19. These studs may be, for example, 2"×4" as known in the trade. Open cavities 9 and 10 in FIG. 1 have been filled with the spray-on insulation while open cavities 21 have not (open cavity 5 is in the process of being filled).

Dry loose-fill blower 23 is attached to hose 11 and may be, for example, a commercially available pneumatic blower which works in conjunction with liquid pump 25 capable of about two gallons per minute at 200 psi (although about 100 psi, for example, may be used during application of the product). Blower 23 functions to blow the loose-fill inorganic mixture through hose 11 to nozzle area 15 where the adhesive is activated by the liquid from hose 13. The liquid is pumped through hose 13 by way of pump 25 as discussed above. The liquid from hose 13 coats the fiberglass and activates the adhesive, and also acts to retain the dampened mixture in cavity 5 during spraying, while the activated adhesive functions to hold the fiber in cavity 5 after curing and provides desirable integrity. The cure time of the mixture in the cavity will be from about 12–36 hours depending upon the ambient temperature, typically about 24 hours or less.

Blow hose 11 and liquid hose 13 may be from about 50 to 150 ft. long. According to preferred embodiments, the hoses are about 150 ft. long, and hose 11 has a 3 inch diameter. Liquid hose 13 may be, for example, a one-quarter inch diameter high pressure hose as will be appreciated by those of skill in the art.

With respect to the hose tips adjacent nozzle area 15, the spray head is defined by a circular metal chamber (not shown) having a one-quarter inch supply line with a control valve and quick connect coupling fitted over a machined nozzle inserted into the discharge end of hose 11 in order to apply the activating liquid (e.g. water) from hose 13 to the dry mixture as it exits the discharge end of hose 11 at the spray head. Spray jets, not shown, (e.g. H1/8VV1501 or H1/8VV2501 commercially available from Spraying Systems, Wheaton, Ill.) are threaded into the face of the spray head in order to atomize and direct the liquid from the discharge end of hose 13 onto the dry mixture before application.

When a 3" Krendl nozzle is used at area 15 at the end of the fiber and liquid hose proximate the area to be insulated, it should be held at about a 10° downward angle for application with the flat side up (i.e. valve on bottom), so the jets are positioned on a compound angle (both inward and upward), whereby proper fiber coating with water when spraying into a wall cavity area or attic area is achieved as is a slight pre-coating of the sheathing in the rear of the cavity area or surface of the attic area.

It has been found by the instant inventors that during spray-on applications into vertically extending open cavities as shown in FIG. 1, the fiberglass mixture adheres better within the cavity when the fiberglass is substantially free of silicone (or other similar hydrophobic agent). Thus, in certain embodiments, substantially non-siliconized loose-fill fiberglass is mixed with the dry RP adhesive in spray-on applications as shown in FIG. 1.

See Tables I–IV below for pump set-up and corresponding typical required times in seconds for spraying particular open stud vertical cavities at the listed densities.

TABLE I

PUMP
Approximate length ot time (seconds) to spray a residential 2" × 4" (inches) open stud cavity 16" on-center by 8' high at a 2.0 lb. per cubic foot density, at the listed pump settings.

| Seconds | 25 | 30 | 35 | 40 |
|---|---|---|---|---|
| PSI (dry) | 125 | 110 | 100 | 95 |
| PSI (wet) | 110 | 100 | 90 | 90 |

TABLE II

Approximate length of time (seconds) to spray a residential 2" × 6" open stud cavity 16" on-center by 8' high at a 2.0 lb. per cubic foot density, at the listed pump settings (PSI).

| Seconds | 40 | 50 | 55 | 60 |
|---|---|---|---|---|
| PSI (dry) | 125 | 110 | 100 | 95 |
| PSI (wet) | 110 | 100 | 90 | 90 |

TABLE III

Approximate length of time (seconds) to spray a 2" × 4" residential open stud cavity 16" on-center by 8' high at a 2.5 lb. per cubic foot density, at the listed pump settings (PSI).

| Seconds | 32 | 38 | 44 | 50 |
|---|---|---|---|---|
| PSI (dry) | 125 | 110 | 100 | 95 |
| PSI (wet) | 110 | 100 | 90 | 90 |

TABLE IV

Approximate length of time (seconds) to spray a 2" × 6" residential open stud cavity 16" on-center by 8' high at a 2.5 lb. per cubic foot density, at the listed pump settings (PSI).

| Seconds | 50 | 63 | 69 | 75 |
|---|---|---|---|---|
| PSI (dry) | 125 | 110 | 100 | 95 |
| PSI (wet) | 110 | 100 | 90 | 90 |

Referring to Charts I–IV above, the “dry” PSI pump setting is for when substantially all virgin fiberglass/RP mixture is being used at the start-up of a job, while the “wet” setting is for when recycled wet fiber/RP mixture is at least partially being also blown either exclusively or along with virgin dry mixture. See Ser. No. 08/805,729 for the recycling fiber description, incorporated herein by reference, utilizing a vacuum to pick up waste fiber/RP mixture and reintroduce same back into the blowing system via a collector box. Thus, the water spray pressure (PSI) is reduced once recycled fiber is being incorporated back into the mix at the mixture hopper/blower.

Due to the methods and processes described herein, the average filling time for a 2"×4" open cavity at 16" on-center, 8' high is about 30–35 seconds, and is about 50–55 seconds for the same style 2"×6" cavity, both at a fiber density of about 2.0 lb./ft$^3$. Meanwhile, 38–44 seconds is the average time for filling a 2"×4" cavity at 16" on-center, 8' high, and likewise 63–69 seconds for the same style 2"×6" cavity, each at a 2.5 lb./ft$^3$ fiber density, given the water pump settings set forth above in the Tables.

In spring/blowing the loose-fill fiberglass/redispersible powder mixture (with activated adhesive) into the open cavity to fill it (or into an attic area to be insulated), the user should attempt to maintain the same nozzle angle with respect to the wall at all times. Once the open cavity is filled to about 10" from the top of a cavity, the user should quickly step in close (with the end of nozzle about 12"–15" from the cavity) and fill the very top of the open cavity and move downward until reaching the previously filled area so as to fill the entire cavity. In this small upper section, the side to side filling rhythm should be about twice the rate of the same rhythm or technique used in the bottom section of the cavity.

This unique fiberglass/redispersible powder mixture, when activated with an activating liquid, sprays well against most types of sheathing, including plywood, particle board, foam board, and various other sheathing products used in the industry including those with foil laminants.

After the open cavity is finished being filled with the insulating mixture, the user may use an electric scrubber to shave off excess fiber. In doing so, the user should start about 12" from the top of the cavity and proceed downward. Thereafter, the user may reverse the scrubber direction so that the roller is rotating upward instead of downward. The remainder of the overspray may then be shaved off by starting at the bottom and moving upward until the open face of the cavity has been completely cleaned. This technique helps reduce the possibility of fiber sagging at the tops of the cavities. After scrubbing drywall or wallboard is affixed to the studs so as to close the insulated cavity after curing of the insulation.

FIG. 2 illustrates perspectively an insulation application system and cross-sectionally a vertically extending enclosed cavity 31. Cavity 31 is bounded by studs laterally and by retaining rigid structure 33 and exterior sheeting 35 on the remaining sides. Blower 23 and liquid pump 25 as well as the hoses in the FIG. 2 embodiment are as in the FIG. 1 embodiment. Additionally, loose-fill material source 37 (e.g. hopper) is shown in FIG. 2 as being in communication with blower 23 via chute 39.

A significant difference between the FIG. 1 and FIG. 2 embodiments is that in FIG. 1, open cavities are being insulated while in FIG. 2 enclosed cavities are being insulated. As shown in FIG. 2, a plurality of holes or apertures 41 are defined in rigid structure or wall 33 thereby allowing the nozzle area of hoses 11 and 13 to be inserted into cavity 31. In such a manner, the dampened insulation with activated adhesive is blown directly into the cavity with structure 33 functioning to hold the insulation in place until the adhesive cures.

It has been found by the instant inventors that conventional siliconized (other hydrophobic agents may also be used) loose-fill mixed with the dry adhesive redispersible powder functions well in closed cavity applications as shown in FIG. 2 and in attic applications.

It has been found by the instant inventors that the use of the dry fiberglass/redispersible powder adhesive mixture in both open cavity (FIG. 1) and closed cavity applications (FIG. 2) results in more uniform and consistent applications, as well as increased productivity potential relative to the prior art fiberglass systems discussed above.

Exemplary equipment for installing the loose-fill/redispersible powder adhesive mixtures according to all embodiments of this invention presented herein are as follows: (i) Blowing machines: Ark-Seal Big Blower (1800 RPM with 90% bleed off and 3% gates recommended), Capitol Equipment Model Nos. 65 and 200 (2400 RPM, ⅓ open gate, and closed bleed-off), William W. Meyer and Sons 800, 1000, 1100 Series 4L Blower, and 3001 Series [3rd gear, 25% open air valve, 2" open slide gate, and 1550 RPM], Krendl Machine Co. Model Nos. 1000 and 2000 (slide gate—7, and air 3½), and Unisul Corp. Vol-U-Matic and Multi-Matic machines (transmission—2nd gear, 1000 RPM, 10⅓ gate and 100% bleed-off where appropriate); (ii) Water Pumps: Dynesco Model MP20 from Krendl or Unisul; (iii) Nozzle: 3 inch nozzle from Krendl Machine Co., Inc.; (iv) Collection Device for recycling system: Collector Box from Guardian Fiberglass, Inc., Albion, Mich.; (v) Wall Scrubbers; Krendl Model #349-B, or Spray Insulation Components Model No. SC 1016, 1024; (vi) Hoses: 3 inch fiber discharge hose or 3½ inch fiber discharge hose with final fifty feet reduced to 3 inch via reducer; (vii) Nozzle Jets: Krendl ¼" QJJ Body and QVV-SS- 2501 tip, or Spraying Systems ¼ inch QJJ Body and QVV-SS-2501 tip; (viii) Fittings: Parker Hannifin B20-5B (female with hose-barb end) and H2C (male with ¼ inch threaded end); and (ix) water supply tank: #T125L from Wylie Mfg. Co. Regarding the equipment set forth herein, Ark-Seal is located in Denver, Colorado; Krendl in Delphos, Ohio; Parker Hannifin in Wickliffe, Ohio; Spraying Systems in Wheaton, Ill.; Unisul in Winter Haven, Fla.; Wylie Mfg. in Petersburg, Tex.; and Meyer in Skokie, Ill.

This invention will now be described with respect to certain examples as follows.

EXAMPLES 1–4

The dry fiberglass/powder mixtures according to Examples 1–4 are set forth below in Chart 1, each element being represented by its percentage in weight relative to the overall mixture. For these Examples, the dry redispersible powder used was RP-238 while the loose-fill fiberglass was conventional white loose-fill coated with silicone available from Guardian Fiberglass, Albion, Michigan. The de-dusting oil and anti-static agent in the mixtures were both conventional.

CHART 1

| Dry Mixture Example No. | % Fiberglass by weight | % De-dusting oil and anti-static agent | % RP-238 dry adhesive by weight |
|---|---|---|---|
| 1 | 99.15% | 0.20% | 0.65% |
| 2 | 99.10% | 0.20% | 0.70% |
| 3 | 99.05% | 0.20% | 0.75% |
| 4 | 98.6% | 0.20% | 1.2% |

EXAMPLES 5–7

While Examples 1–4 set forth above in Chart 1 represent the make-up of four different dry mixtures, Examples 5–7 describe the spray-on application of a dry mixture made up of 0.20% de-dusting/anti-static, 1.10% RP-238 dry adhesive, and 98.7% by weight white loose-fill fiberglass (with no hydrophobic agent). The insulation products of Examples 5–7 were applied as shown in FIG. 1. Commercially available neumatic blowing machine 23 was used to apply the dry mixture including the adhesive, blower 23 being initially set to run at about 1950–1980 RPM. Pump 25 and hose 13 were used to supply water to nozzle area 15 so that the dry mixture exiting hose 11 was coated with water (in order to activate the adhesive) before spraying into cavity 5. Four jets (H1/8VV1501 at 100 PSI) were used at nozzle area 15 adjusted to the twelve o'clock and six o'clock positions as known in the trade with a flat spray projectory being set in the horizontal position of each jet. Stainless steel tipped jets are preferable over brass ones.

User 3 stood on the ground approximately five to six feet from wall structure 7. Rear wall 32 was made of plywood. The user turned on blower 23 and then immediately turned on the flow valve for water hose 13. The loose-fill fiberglass/dry adhesive mixture discharged from the nozzle end of hose 11 was coated with water from hose 13 in order to activate the adhesive and thereafter sprayed or blown into cavity 5 where it was retained as shown in FIG. 1. User 3 manipulated the spray nozzle in a side to side or back and forth manner building shelf upon shelf 16 of insulation starting at the bottom of cavity 5 near the lower horizontal stud 19 and proceeded upward as the cavity was filled. All studs were 2"×4" and made of wood. Cavity 5 was filled to an insulation thickness of about 1" beyond (or exterior) the most outward protrusion of vertical studs 17 (i.e. the insulation was applied to a thickness of about 4.5 to 5.0 inches originally).

Immediately after spraying the dampened mixture into cavity 5, the installed fiberglass product was compression rolled using a non-stick roller (not shown) so as to pack the insulation within the cavity to a thickness of about 3.5 inches substantially flush with the exterior faces of studs 17. After rolling, if and when gaps or voids in the insulation finally became observed or evident, residual or overspray fiberglass which had fallen to the floor was placed and packed in the cavity to fill such voids. Alternatively, an electric wall scrubber may be used to shave off excess insulation from the cavities after blowing.

The front faces of studs 17 and 19 were then cleaned so that wallboard could be applied in order to close cavity 5. The user then allowed the installed fiberglass to cure (i.e. dry). Curing at this 3.5 inch thickness took about twenty-four hours after which the applied LOI data was taken.

The procedures and steps set forth above were carried out numerous times (the temperature was ambient atmosphere) resulting in the three Examples set forth in Chart 2 below for Examples 5–7.

CHART 2

| Example No. | Density (lb.\ft$^3$) | R-Value at 3.5" thickness | Applied LOI % |
|---|---|---|---|
| 5 | 2.5 | 13.4 | 1.38% |
| 6 | 2.27 | 11.9 | 1.36% |
| 7 | 2.00 | 13.0 | 1.36% |

The density data in pounds per cubic foot (lb.\ft$^3$) taken and set forth in Chart 2 illustrates that the density of the installed and cured insulation product was less than or equal to about 2.5 lb.\ft$^3$, more preferably less than or equal to about 2.0 lb.\ft$^3$ according to certain embodiments of this invention, while the R-value was greater than about 11, more preferably greater than about 12, and most preferably greater than about 13 given an insulation thickness of about 3.5 inches. This translates into R-values of at least about 3.15 per inch thickness, 3.43 per inch thickness, and 3.71 per inch thickness respectively.

With respect to the applied LOI data set forth in Chart 2, this is indicative of the binder content of the final product resulting from the RP-238 dry adhesive powder as activated by the water. In other words, the applied LOI shown in Chart 2 is not an indication of the de-dusting oil and anti-static agent contents. The applied LOI percent is generally less than about 2.0% according to certain embodiments of this invention, and more preferably less than about 1.50% and most preferably less than about 1.38%. This LOI data is applicable to any and all embodiments set forth herein, including attic applications and open cavity applications.

It has been found surprisingly that reducing the amount of anti-static material results in better adhesive distribution and adherance, and a better final product. Chart 3 below illustrates theoretical examples of dry fiberglass/RP mixtures (with reduced amounts of anti-stat) which may be blown into attics or open vertical wall cavities in all embodiments of this invention.

CHART 3

| Dry Mixture Example No. | % Fiber-glass by Weight | % RP Dry Adhesive by Weight | % Anti-Static Material by Weight | % De-dusting Oil |
|---|---|---|---|---|
| 8 | 99.0% | 0.90% | 0% | 0.10% |
| 9 | 99.1% | 0.80% | 0% | 0.10% |
| 10 | 98.8% | 0.95% | 0.10% | 0.15% |
| 11 | 99.25% | 0.50% | 0.05% | 0.20% |
| 12 | 99.40% | 0.50% | 0% | 0.10% |
| 13 | 97.5% | 2.35% | 0% | 0.15% |
| 14 | 98.0% | 1.75% | 0% | 0.25% |
| 15 | 98.6% | 1.25% | 0% | 0.15% |
| 16 | 98.5% | 1.35% | 0% | 0.15% |

Surprisingly, the instant inventors have found that reducing the amount of anti-static material (e.g. quaternary ammonium salts available from Sunshine Chemical Specialties, Inc., Pennsauken, N.J.) [trade name of CS-II] improves the adhesion between the fibers and redispersible powder within the insulation mixture. For example, in Chart 3 set forth above, dry mixture example nos. 8, 9, and 12–16 are completely free of anti-static material, while dry mixture example no. 11 is substantially free of anti-static material (i.e. less than about 0.05% by weight anti-static material), and dry mixture example no. 10 has only 0.10% by weight anti-static material in the mixture. As can be seen from chart 3, none of the dry mixture examples presented in this chart contain any sand, lime, plaster of Paris or cement and thus these dry mixtures are not "mortars" as this term is defined in the art. By providing the mixture with less than or equal to about 0.10% by weight anti-static material (e.g. quaternary ammonium salt, or any other conventional anti-static material) the adhesion between the RP and glass fibers has surprisingly been found to be improved, with the result being the RP being more evenly and uniformly distributed throughout the mixture thereby resulting in more uniform applications and improved final products.

Another problem believed to exist by the instant inventive entity, is potential scenarios where insulation contractors apply the insulation mixture into attics, wall cavities, or the like without using the adhesive activating liquid (e.g. water) in order to save time and/or money. This is undesirable. Accordingly, a unique system (for use with all embodiments herein) to be described below has been developed in order to combat this potential problem and to allow a manufacturer to, upon examination of a final product, determine whether or not the contractor who installed the insulation followed specified procedures (i.e. whether the contractor used the activating liquid). To begin with, the initial insulation mixture, as set forth above in Chart 3, includes from about 97.4% to 99.40% by weight loose-fill fiberglass, from about 0.25% to 2.5% by weight redispersible powder adhesive, from about 0% to 0.10% anti-static material, and finally from about 0.01% to 0.15% by weight dry powder color dye in an unactivated particulate powder form. This mixture preferably includes from about 0.02% to 0.10% by weight of the dye, and most preferably approximately from about 0.02% to 0.05% by weight of the unactivated color dye. Exemplary dyes which may be used include Croceine Scarlet M00, available from Chromatech, Inc., Plymouth, Mich., and/or Tricosol Blue No. 17732, available from Tricon Colors, Inc., Elmwood Park, N.J. It is important to note that the dye(s) is/are provided in the insulation mixture in a unactivated dry form in an amount such that the fibers themselves are not colored substantially prior to activation upon installation into an attic or wall cavity. Due to these water or liquid activated dyes, enough color is provided when the insulation mixture is installed along with the adhesive and dye activating liquid (e.g. water) as discussed above, so that the dye in particulate form is activated (i.e. becomes colored) when hit with the activating liquid upon installation so that the final installed insulation product is provided with colored specs or portions of activated dye which indicate that the insulation was installed along with the adhesive activating liquid (e.g. water).

When the loose-fill mixture is made, the dye and RP may be mixed together to form a dry-mix, with this dry-mix then being mixed in with the loose-fill fiberglass or plastic fibers in order to form the mixture. Green, blue, and/or red dye(s) may be used in certain embodiments.

Figure 3:
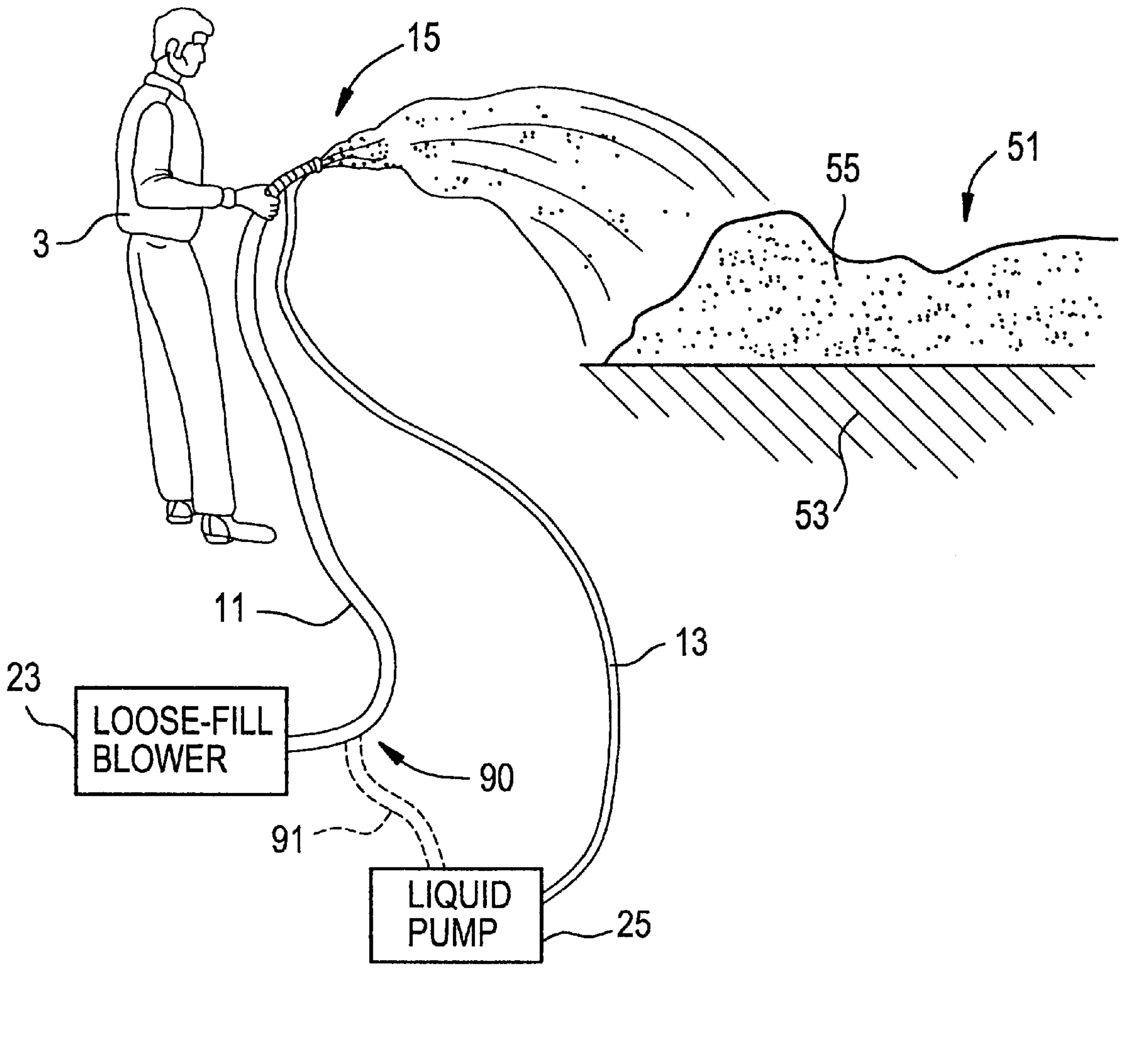
FIG. 3 is a perspective view of another embodiment of this invention wherein a user is blowing/spraying a loose-fill fiberglass/dry adhesive mixture coated with an activating liquid, such as water, into an area (e.g. attic area) to be insulated.

FIG. 3 is a perspective view of another embodiment of this invention wherein the loose-fill fiberglass and redispersible powder (RP) adhesive mixture coated with an activating liquid, such as water, is blown into or onto an attic area 51 to be insulated. Siliconized or non-siliconized fiberglass may be used in attic applications. The area 51 to be insulated includes supporting structure 53 which may be substantially horizontal or inclined according to different embodiments of this invention. On top of surface 53, the insulation mixture 55 is blown or sprayed. The loose-fill fiberglass, as discussed above, is dry mixed with any of the above-discussed redispersible powders and is thereafter added to blower 23 and blown through hose 11 so that the dry mixture is coated at the nozzle area with the activating liquid (e.g. water) which is pumped through hose 13 at from about 50–60 psi. Thus, the redispersible powder (RP) adhesive is activated by the water at the nozzle and is blown toward attic area 51 to be insulated in an activated state. The nozzle may be located at the end of both hoses as shown in FIG. 1, or alternatively remote from the area to be insulated as shown in FIG. 3 in dotted lines.

The use of the polymeric based redispersible powder (RP) adhesive in the insulation mixture 55 provides an improvement over the prior art in that the adhesive is quick setting and the insulation is subject to less movement or shifting in the horizontal or sloping attic area, or the like. This effect of the redispersible powder emulsion is especially useful on inclined attic surfaces and in the open wall cavities discussed above.

The dry mixture in attic applications may sometimes be different than in open wall cavity applications, in that for attics the mixture is from about 0.75 to 2.5% RP by weight, preferably from about 1.5 to 2.25%. RP-238 and RP-140 are preferable as RPs.

Redispersible powders (RP) are known to be spray-dried liquid latex, wherein a liquid emulsion is converted at high temperatures into a free-flowing powder that, when mixed with water or the like, produces a stable latex with properties comparable to those of the original liquid. Redispersible powders are typically utilized with cement-aggregate materials. Airflex® redispersible powders, based on copolymers of vinyl acetate and ethylene, are preferably used according to certain embodiments of this invention as listed above, these powders being characterized by copolymerization of ethylene with vinyl acetate. Polyvinyl alcohol, also an efficient binder, is the protective colloid which imparts redispersibility to the powders. This description of redispersible powders is, of course, known and applies to all embodiments herein. The instant inventors have uncovered the surprising fact that redispersible powder, when mixed with fiberglass or other fiber insulation, results in improved results relating to spraying/blowing same and the finished product. Melt-blown plastic fiber insulation (e.g. polyethylene) may also be used in conjunction with these RPs in place of the glass fibers in all embodiments herein.

Still referring to FIG. 3, the activated loose-fill mixture is blown into attic area 51 to be insulated with the result being an attic R-value of insulation 55 of from about R-19 up to about R-45, a cured insulation 55 thickness of from about 5 to 25 inches, and a cured insulation 55 density of from about 0.25 lbs./$ft^3$ up to about 1.5 lbs./$ft^3$, and preferably the density being from about 0.75 lbs./$ft^3$ to 1.25 lbs./$ft^3$. In certain attic embodiments, the R-value will be at least about 2.7 per inch thickness of insulation, preferably greater than about 3.0 per inch thickness, and most preferably at least about 3.15 per inch thickness.

In attic applications, the wet mixture as blown/sprayed from the and of hose 11 or nozzle is from about 15% to 30% by weight water and the remainder the fiberglass/RP mixture. Optionally, a liquid adhesive may be used in attic applications instead of RP, as discussed in Ser. No. 08/572,626.

Figure 4:
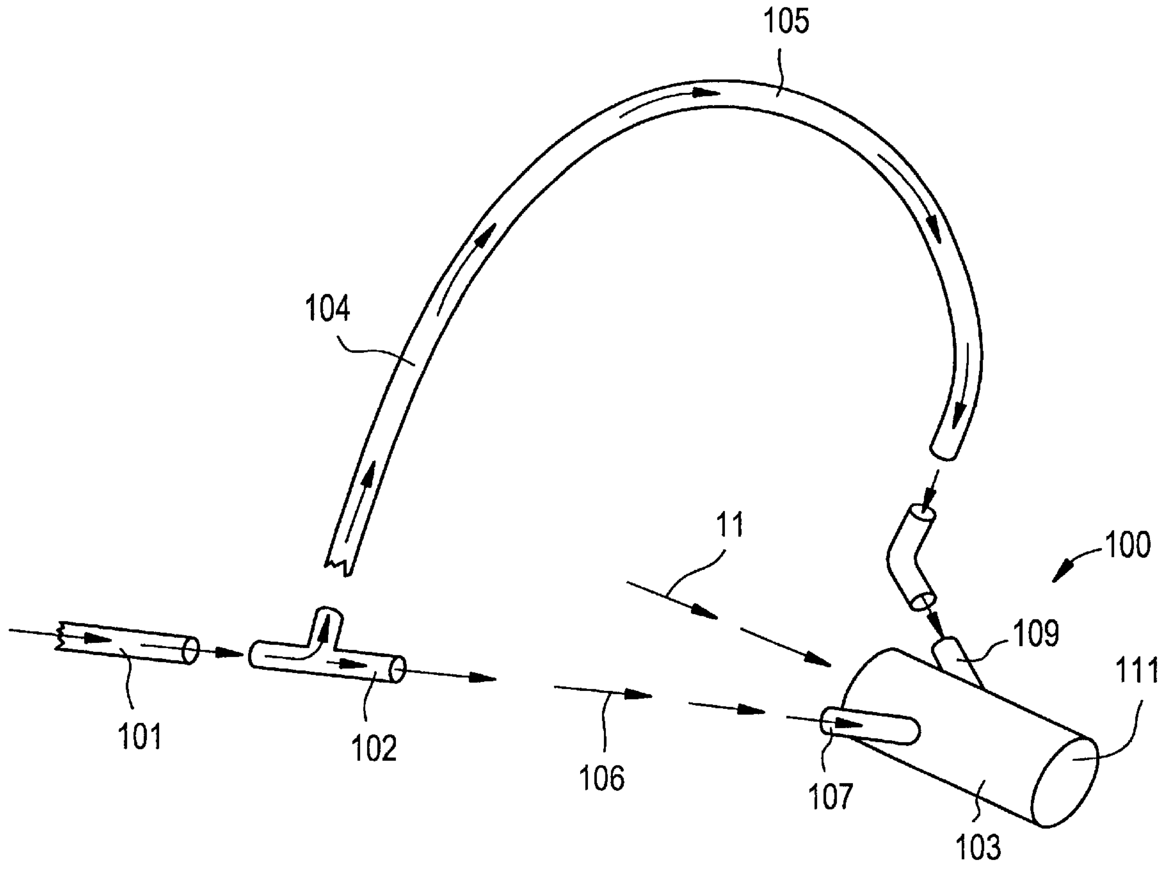
FIG. 4 is an exploded perspective view of a nozzle which may be used in certain embodiments of this invention.

FIG. 4 is an exploded perspective view illustrating a nozzle assembly 100 that may be used in conjunction with any of the spraying embodiments herein for the purpose of spraying the activated fiber/RP mixture toward the area to be insulated. As illustrated, nozzle assembly 100 in FIG. 4 includes line 101 for conveying the activating liquid from its reservoir toward the nozzle, T-member 102 for allowing one portion 106 the activating liquid (e.g. water) to continue flowing directly toward nozzle 103 and another portion 104 to veer off into tube or conduit 105. Thus, the first portion 106 of activating liquid from T-member 102 flows into nozzle inlet 107 while the second portion 104 of activating liquid from the T-member flows through conduit 105 and into another nozzle inlet 109. The fiberglass/redispersible powder dry mixture is blown toward nozzle 103 through tube 11. Thus, when the fiber/RP dry mixture enters nozzle 103, it is hit on opposite sides by the activating liquid from inlets 107 and 109 thereby thoroughly activating the RP within the mixture. Thereafter, the mixture with the activated adhesive is blown through outlet 111 of nozzle 103 and toward either an open wall cavity area to be insulated or toward an attic area to be insulated.

In certain embodiments (attic and open wall cavity), the nozzle 103 in FIG. 4 (or any other nozzle 15 herein) may be located at location 90 adjacent the blower 23 (i.e. remote from the area or cavity to be insulated) so that the water hose inputs the water into hose 11 back near the blower and/or truck instead of in the attic or home being insulated, so as to allow the adhesive and fiber to thoroughly mix in an activated state as it travels through hose 11 toward the cavity or attic to be insulated. An exemplary water hose 91 is shown in dotted lines in FIG. 4 for such an embodiment.

It should be noted that according to certain attic embodiments, the fiberglass/RP mixture is from about 0.75 to 2.5% by weight dispersible powder, from about 97.4 to 99.25% by weight loose-fill fiberglass, and the remainder being made up of small amounts of de-dusting oil as set forth in Chart 1 and optionally a small amount of silicone as is known in the art. The preferred LOI% of the cured insulation would be from about 0.75% to 2.5% in attic applications (and usually no greater than about 3.0%, and most preferably no greater than about 2.0% LOI).

Once given the above disclosure, many other features, modifications, and improvements will become apparent to the skilled artisan. Such other features, modifications, and improvements are therefore considered to be a part of this invention, the scope of which is to be determined by the following claims.

We claim:

1. A dry loose-fill fiberglass insulation, mixture adapted to be blown together with an activating liquid, the mixture consisting essentially of:

loose-fill fiberglass; and a polymeric redispersible powder resin adhesive mixed with said loose-fill fiberglass so that when the mixture of loose-fill fiberglass and redispersible powder adhesive is coated with an activating liquid and blown toward the area to be insulated said redispersible powder adhesive is activated, and wherein the mixture of loose-fill fiberglass and redispersible powder adhesive is substantially free of an anti-static material so that the redispersible powder adhesive is more evenly distributed throughout the mixture.

2. A dry loose-fill fiberglass insulation mixture according to claim 1, the mixture further including a dry liquid-activated color dye mixed with said loose-fill fiberglass and redispersible powder, said color dye being activatable by said activating liquid when said mixture is blown toward the area to be insulated.

3. A dry loose-fill fiberglass insulation mixture according to claim 2 wherein said mixture includes 0.10% weight percent or less of said anti-static material such that static electricity provides a substantially uniform distribution of the redispersible powder and color dye throughout the dry mixture.

4. A dry loose-fill fiberglass insulation, the mixture according to claim 1 which consists essentially of by weight:

a. 98.6%–99.15% fiberglass;

b. 0.20% de-dusting oil and anti-static agent; and c. 0.65%–1.2% dry adhesive.

* * * * *

UNITED STATES PATENT AND TRADEMARK OFFICE

CERTIFICATE OF CORRECTION

PATENT NO. : 6,262,164
DATED : July 17, 2002
INVENTOR(S) : Church et al.

It is certified that error appears in the above-identified patent and that said Letters Patent is hereby corrected as shown below:

Column 3,
Line 37, delete "LOT", and insert -- LOI --.

Signed and Sealed this

Seventh Day of May, 2002

*Attest:*

JAMES E. ROGAN

*Director of the United States Patent and Trademark Office*

*Attesting Officer*